Patented Oct. 11, 1949

2,484,508

UNITED STATES PATENT OFFICE 2,484,508

ORGANODISTANNONIC ACIDS

Julian W. Hill, Wilmington, Del., assignor to E. I. du Pont de Nemours & Company, Wilmington, Del., a corporation of Delaware No Drawing. Application October 7, 1946, Serial No. 701,617

3 Claims. (Cl. 260—429)

This invention relates to new compositions of matter and more particularly to new organo-tin compounds and to a process for their preparation.

It is an object of this invention to provide a new class of organo-tin compounds. A further object is to provide new compositions of matter, the organodistannonic acids, and a method for their preparation. A still further object is to provide hydrocarbondistannonic acids and a method for their preparation. Another object is to provide alkanedistannonic acids and a method for their preparation. Other objects will appear hereinafter.

These objects are accomplished by the following invention of organodistannonic acids and a method for their preparation which comprises reacting an organic dihalide with an alkali metal stannite in alkaline solution. The products formed are organodistanonic acids having the formula $R(SnOOH)_2$ wherein R is a divalent organic radical. The hydrocarbondistannonic acids having the formula $R(SnOOH)_2$ wherein R is a divalent hydrocarbon radical are preferred products of this invention. Still more preferred products are the aliphatic hydrocarbondistannonic acids having the formula $R(SnOOH)_2$ wherein R is a divalent aliphatic hydrocarbon radical. The most preferred products are the alkanedistannonic acids having the formula $R(SnOOH)_2$ wherein R is an alkylene radical, that is—$(CH_2)_n$—where $n$ is a positive integer. These preferred products are prepared by reacting the corresponding dihalide, that is a hydrocarbon dihalide, an aliphatic hydrocarbon dihalide or an alkylene dihalide with an alkali metal stannite in alkaline solution.

In carrying out the preparation of organodistannonic acids, the first step involves the preparation of stable alkali metal stannite solutions. In the case of potassium stannite, this may be done conveniently by addition of dilute aqueous or alcoholic stannous chloride solution, with stirring, to a dilute aqueous potassium hydroxide solution that contains 8 moles of potassium hydroxide for each mole of stannous chloride used. The potassium hydroxide solution is cooled to 0° C. before the stannous chloride is added, and the stannous chloride solution is added at such a rate that the temperature of the reaction solution does not exceed 5° C. Sufficient solvent is used so that the final concentration of potassium stannite is not greater than about 10%. The solution is stirred at 0–3° C. until all the white precipitate that forms on addition of the stannous chloride dissolves.

A solution containing an organic dihalide dissolved in ethanol, preferably 0.5 to 1.0 mole of an alkylene dihalide per mole of stannous chloride used to prepare the potassium stannite solution, is added to the potassium stannite solution and the reaction is run at a temperature of 20° to 50° C. with stirring for 10 to 70 hours.

The product is isolated by saturating the reaction solution with carbon dioxide. The precipitate that forms on addition of carbon dioxide is collected on a filter and dried. The organodistannonic acid is obtained by adding this precipitate to water at a temperature of 90° C. Carbon dioxide is evolved and the distannonic acid precipitates from solution as an amorphous solid. The product is collected on a filter and dried.

It is important that the reaction be carried out at a temperature substantially below 100° C. The reaction is usually carried out at temperatures below 50° C. and preferably at a temperature of 20° to 35° C. If the reaction temperature is greater than about 50° C. the potassium stannite is likely to undergo auto-oxidation and reduction.

The reaction time and temperature are interdependent variables. At temperatures of 25° to 35°. It is usually necessary to carry out the reaction for 10 to 20 hours to obtain complete reaction of the organic dihalide with the alkali metal stannite. At a temperature of 50° C. the reaction is substantially complete in 5 to 10 hours. The time required for substantially complete reaction also depends on the reactivity of the halogen atoms in the organic dihalide and on the degree to which the organic dihalide is dispersed in the reaction solution.

In carrying out the preparation of organodistannonic acids, at least one mole of organic dihalide is used for each 2 moles of alkali metal stannite. However, to insure complete reaction, it is desirable to use an excess of organic dihalide. It is preferred to use 1 or 2 moles of organic dihalide for each two moles of alkali metal stannite although a greater excess may be used if desired.

The organic dihalide may be added directly to the alkali metal stannite solution. However, since most organic dihalides are insoluble in aqueous solutions, it is desirable to add a solution of organic dihalide in a water miscible solvent, such as ethanol. Solutions containing 1 to 10 parts alcohol for each part of organic dihalide may be used. It is preferred to add solutions of the organic dihalide in 5 to 8 parts ethanol for each part of organic dihalide, since under these conditions a homogeneous reaction solution results. It is also desirable to cool the alkali stannite solution during addition of the organic dihalide and to add the organic dihalide at such a rate that the temperature of the alkali metal stannite solution does not exceed 20° C.

The organodistannonic acid is isolated by careful neutralization of the reaction solution. This may be accomplished with any mineral acid or organic acid. However, since the organodistannonic acids are soluble in dilute acid solutions, care must be taken that an excess of acid is not used. A more convenient method for isolating the organodistannonic acid is to saturate the reaction solution with carbon dioxide. The distanonnic acid is precipitated from solution as a carbonate and may be isolated by decomposing the carbonate with hot water. The distannonic acid is obtained essentially pure after washing thoroughly with water.

The distannonic acids are bifunctional and may be used as polymer intermediates, thus materially differing from the monostannonic acids. Furthermore, the distannonic acids react with alkali to give polymeric stannones, such as $[-(CH_2)_3-SnO-]_x$ which is insoluble in dilute hydrochloric acid and does not decompose at high temperatures up to 360° C. Monostannonic acids react with alkali to form monomeric stannones, such as $(CH_3)_2SnO$ which is soluble in dilute hydrochloric acid and decomposes at 245° C.

This invention is further illustrated by the following examples in which the amounts are stated in parts by weight, unless otherwise specified.

*Example I*

An aqueous potassium stannite solution was prepared by addition of a solution containing 564 parts $SnCl_2.2H_2O$ dissolved in 1000 parts water to a solution containing 1320 parts potassium hydroxide pellets (1120 parts KOH) dissolved in 4000 parts water and cooled to a temperature of 2° C. The stannous chloride solution was added over a period of two hours and the potassium hydroxide solution was maintained at a temperature below +2° C. by external cooling. A solution containing 550 parts of 1,3-dibromopropane dissolved in 3160 parts ethanol was added to the potassium stannite solution at such a rate that the temperature of the potassium stannite solution did not exceed 15° C. The resulting solution was stirred for 16 hours at a temperature of 25° C. Carbon dioxide gas was passed through the solution at 25° C. for 4 hours, which caused a precipitate to form. The alcohol was removed from the solution by distillation and the precipitate was collected on a filter and dried. The precipitate was added to 1000 parts water at a temperature of 90° C. which caused carbon dioxide gas to be evolved. The solid that precipitated was collected on a filter and dried. Analyses indicated a tin content of 69.1%. The theoretical tin content of propane-1,3-distannonic acid is 68.8%.

*Example II*

A potassium stannite solution was prepared as described in Example I except that the stannous chloride was dissolved in 870 parts of ethanol instead of water. To the potassium stannite solution was added a solution containing 840 parts 1,10-dibromodecane dissolved in 4000 parts ethanol and the solution was stirred at a temperature of 25° C. for 70 hours. The decane-1,10-distannonic acid was isolated as described in Example I.

The alkanedistannonic acids prepared by the process of this invention are amorphous solids that are soluble in dilute aqueous hydrochloric acid and sodium hydroxide solutions, but insoluble in water and organic solvents. They do not fuse at temperatures up to 320° C.

Any alkali metal stannite solution, such as potassium stannite solution, that is stable at temperatures up to 50° C. is suitable for use in this invention. It is preferred to use solutions prepared from 8 moles alkali metal hydroxide for each mole of stannous chloride in which the concentration of alkali metal stannite is preferably not greater than 10%. These solutions are stable at temperatures up to 50° C. and contain sufficient alkali for reaction with organic dihalides.

Either alcoholic or aqueous stannous chloride solutions can be used in preparing the alkali metal stannite solutions. It is preferred to prepare these solutions at temperatures below 5° C. since solutions prepared at higher temperatures are likely to undergo autooxidation and reduction during their preparation with the formation of tin and alkali metal stannate. Aqueous potassium stannite solutions are preferred for use in this invention.

Saturated or unsaturated organic dihalides are suitable for use in this invention. Examples of suitable agents are methylene iodide, methylene chloride, 1,3-dibromopropane, 1,5-dichloropentane, 1,10-dibromodecane, 1,16-dibromohexadecane, 1,3-dichlorobutane, 2-methyl-1,4-dichlorobutane, 1,4-dibromobutene-2, 1,4-dichlorobutene-2, 1,4-dichlorobutene-2 and the like. Other types of dihalides that may be used include p-xylylene dichloride, p-xylylene dibromide, dichlorodiethyl ether, glycerol 1,3-dichlorohydrin and the like. Although the organic difluorides may be used, the more reactive dichlorides, dibromides and diiodides are preferred. Thus, from the above mentioned dihalides there can be obtained alkanedistannonic acids, such as methanedistannonic, propane-1,3-distannonic, pentane-1,5-distannonic, decane-1,10-distannonic, hexadecane-1,16-distannonic, butane-1,3-distannonic and 2-methylbutane-1,4-distannonic acids; alkenedistannonic acids, such as 2-butene-1,4-distannonic acid; hydrocarbon distannonic acids, such as p-xylenedistannonic acid; and organodistannonic acids, such as 3-oxapentane-1,5-distannonic and 2-hydroxy-1,3-propanedistannonic acids.

The products of this invention are useful as intermediates for a new class of organo-inorganic polymers.

As many apparently widely different embodiments of this invention may be made without departing from the spirit and scope thereof, it is to be understood that the invention is not limited to the specific embodiments thereof except as defined in the appended claims.

I claim:

1. An alkanedistannonic acid having a straight chain consisting of at least three and not more than ten carbon atoms, the two stannonic acid groups being attached to the respective terminal carbon atoms of said straight chain and the remaining valences of the intermediate carbon atoms of said straight chain being attached solely to hydrogen atoms.

2. Propane-1,3-distannonic acid.
3. Decane-1,10-distannonic acid.

JULIAN W. HILL.

REFERENCES CITED

The following references are of record in the file of this patent:

UNITED STATES PATENTS

| Number | Name | Date |
|---|---|---|
| 1,573,738 | Oechslin | Feb. 16, 1926 |

OTHER REFERENCES

Lesbre et al., "Comptes rendus" (Paris), vol. 198, pgs. 1426–7.

Lesbre, "Bull. Soc. Chim." (Paris), 5th series, vol. 2, pages 1189–1201 (1935).